United States Patent [19]

Murphy

[11] 4,042,566
[45] Aug. 16, 1977

[54] POLYETHYLENIC POLYETHERS AND SOLVENT SOLUBLE COPOLYMERS THEREOF

[75] Inventor: Edward J. Murphy, Hoffman Estates, Ill.

[73] Assignee: DeSoto, Inc., Des Plaines, Ill.

[21] Appl. No.: 695,186

[22] Filed: June 11, 1976

[51] Int. Cl.$^2$ .................... C07C 33/06; C08F 16/00
[52] U.S. Cl. ......................... 260/47 EP; 260/47 UA; 260/47 UP; 260/613 R; 260/837 R; 526/333; 526/273
[58] Field of Search ........ 260/47 EP, 47 UA, 47 UP, 260/613 R, 837 R

[56] References Cited

U.S. PATENT DOCUMENTS

| | | | |
|---|---|---|---|
| 3,450,613 | 6/1969 | Steinberg | 204/159.15 |
| 3,670,047 | 6/1972 | Broecker | 260/837 R |
| 3,676,398 | 7/1972 | D'Alelio | 260/47 EP |
| 3,890,273 | 6/1975 | Saito | 260/47 UA |

*Primary Examiner*—Harold D. Anderson
*Assistant Examiner*—E. A. Nielsen
*Attorney, Agent, or Firm*—Dressler, Goldsmith, Clement, Gordon & Shore, Ltd.

[57] ABSTRACT

Polyethylenically unsaturated polyethers are produced by reacting a diepoxide with a stoichiometric proportion of a bisphenol to provide a phenolic OH terminated intermediate which is then reacted with a molar excess of ethylenically unsaturated monoepoxide. These polyethylenic polyethers are copolymerized with monoethylenic monomers in organic solvent solution to provide organic soluble copolymers.

13 Claims, No Drawings

POLYETHYLENIC POLYETHERS AND SOLVENT SOLUBLE COPOLYMERS THEREOF

The present invention relates to the production of polyethylenically unsaturated polyethers and includes organic solvent-soluble copolymers thereof with monoethylenic monomers.

Polyethylenic polyethers are presently produced by etherifying a polyepoxide with an ethylenically unsaturated alcohol, such as allyl alcohol or oleyl alcohol. This etherification reaction is difficult and costly because a stoichiometric excess of unreacted alcohol must be present to consume all of the epoxy groups in the polyepoxide. Also, the specific reactivity of the hydroxy group in the unsaturated alcohol is relatively weak which leads to undesired epoxy homopolymerization. Further, the etherification reaction must be carried out at low solids content in a limited selection of organic solvents, and it is usually necessary to remove at least a portion of these solvents before the polyethylenic polyether can be used for its desired purpose.

In accordance with this invention, the starting polyepoxide is reacted with about one mole of a bisphenol per epoxy equivalent in the polyepoxide to substantially consume the epoxy functionality and provide a derivative carrying phenolic OH terminal groups (one for each epoxy group initially present). This phenolic OH terminated intermediate is then reacted with a molar excess of a polymerizable ethylenically unsaturated monoepoxide, preferably one which is monoethylenic, such a allyl glycidyl ether. Again, the reaction is between the phenolic OH groups and the epoxide group, and this provides a polyethylenic polyether without using unsaturated alcohols in a direct etherification reaction.

The above procedure has many advantages. First, the polyepoxide and bisphenol reactants can be used in stoichiometric proportions. Second, the reaction of the epoxy groups with the phenolic OH group is strongly preferred to any reaction of the epoxy group with the secondary hydroxy group which may be present in the epoxy resin. This hydroxyl group is sometimes termed an alcoholic hydroxyl group. In this way, epoxy homopolymerization is minimized. Also, the reaction can be run at very high solids content and post stripping of solvents or unreacted reactants is not needed. Reactor dwell time is also minimized.

It is important to first form the phenolic OH terminated intermediate and then react the unsaturated monoepoxide with it. If one attempts to reverse procedure, e.g., reaction of the unsaturated monoepoxide with the bisphenol, then a portion of the unsaturated monoepoxide reacts with both of the phenolic OH groups on a single bisphenol, providing a low molecular weight polyethylenic compound which tends to cause undesired side reactions, e.g., gelation on subsequent copolymerization.

Thus, the starting material in this invention is a polyepoxide, and when organic solvent-soluble copolymers are desired, the polyepoxide does not contain more than about 2.0 epoxy groups per molecule, and is preferably a diglycidyl ether of a bisphenol. The term "a bisphenol", is well known and denotes a pair of phenolic groups coupled together through an intervening alkylene group which may contain from 1-20 carbon atoms, preferably from 2-6 carbon atoms. As previously noted, polyepoxides are broadly useful, such as epoxidized soya oil or epoxidized novolacs, but the epoxy functionality is preferably not in excess of 2.0. This means that diepoxides are preferred, and these are sometimes available as mixtures of monoepoxides and diepoxides having a 1,2-epoxy equivalency of from 1.2 to about 2.0, preferably from 1.4 to 2.0. Bisphenol A is the usual commercial bisphenol and is preferred, both in the polyepoxide, and also in the bisphenol reactant. Commercial materials of the type noted are available in commerce, Epon 828, Epon 1001 (Shell Chemical Company) and Araldite 6010 (Ciba-Geigy) being illustrative. These products are diglycidyl ethers of bisphenol A having an epoxy equivalency of about 2.0.

The bisphenol reactant can be any bisphenol as previously defined, the preferred bisphenol A being 2,2'-bis(p-hydroxyphenyl) propane. The corresponding derivatives of butane and hexane will further illustrate the class. Also, the hydroxy phenyl can be replaced by hydroxy cresyl.

The reaction is the simple and well known reaction of phenolic OH with the epoxy group, this reaction usually proceeding in the presence of a base, such as an alkali hydroxide, and heat. Indeed, this reaction is commonly carried out using a stoichiometric excess of diepoxide to increase the molecular weight of the epoxy resin. Here, a balance is obtained between the number of epoxy groups and the number of moles of the bisphenol, and the result is the production primarily of a product in which one molecule of bisphenol is positioned at each end of the starting diepoxide. The desired reaction is as follows:

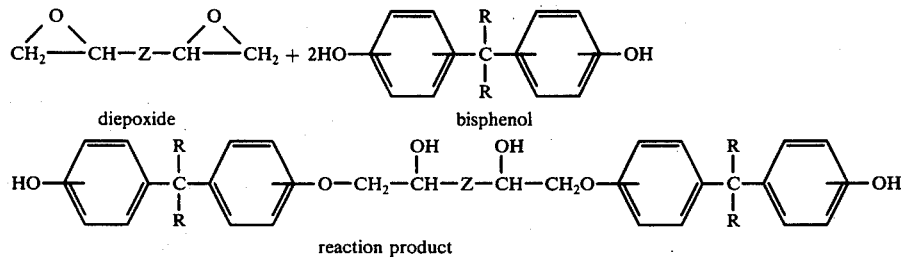

In the above formulas, Z is the organic residue of the diepoxide, and R denotes alkyl groups. Z perferably lacks polymerizable unsaturation and consists of carbon, hydrogen, and oxygen with the oxygen being present only in ether or hydroxy forms.

The reaction consumes substantially all of the epoxy functionality and the product possesses increased molecular weight in comparison with the starting reactants. Because there is an increase in molecular weight and because I primarily desire solvent soluble copolymers, the starting diepoxide preferably has a molecular weight of less than 1000, most preferably less than 500.

Diepoxides which are liquids or semi-solids at room temperature are particularly preferred. Epon 828 will illustrate these liquid to semi-solid diepoxides.

As a matter of reaction procedure, it is best to add the diepoxide slowly to the hot bisphenol containing the alkali metal hydroxide catalyst. This maintains the bisphenol reactant in excess until diepoxide addition is complete, and this helps to minimize molecular weight.

The ethylenically unsaturated monoepoxide is then added, and the same epoxy-phenolic OH reaction begins again, now being fueled by the added monoepoxide. This produces (using allyl glycidyl ether to illustrate the reaction):

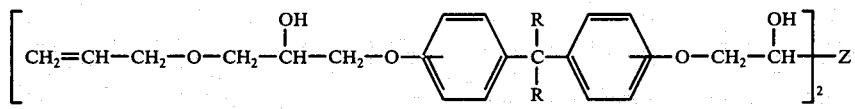

Z and R in the above formula are the same as previously noted.

Allyl glycidyl ether is particularly preferred, but methallyl glycidyl ether is also useful. In conformity with conventional usage, the language "ethylenically unsaturated monoepoxide" negates the presence of any reactive functionality other than the ethylenic unsaturation and the single epoxide group. Other polymerizable ethylenically unsaturated monoepoxides are not now available in commerce, but they react in the same way as the preferred allyl glycidyl ether. Thus, one can react sodium linoleate with epichlorohydrin to form an ester and then remove sodium chloride. The product would be an ethylenically unsaturated monoepoxide fully operative herein. The monoethylenic monoepoxides are preferred.

A molar excess of the unsaturated monoepoxide is used to provide a polethylenic product. Preferably, most or all of the phenolic OH groups are reacted with a stoichiometric proportion of monoepoxide to provide from 1.2 to 2.0 unsaturated groups per molecule.

Excess unreacted allyl glycidyl ether is not desired, but small amounts may be tolerated. Especially if the product is copolymerized with monoethylenic monomers, the unreacted allyl glycidyl ether would simply be consumed in the polymerization to form part of the copolymer product.

It is possible to directly convert the polyethylenic polyethers of this invention to solid thermoset polymers by copolymerization with vinyl monomers such as styrene in a bulk polymerization, but the preferred products are solvent-soluble, nongelled copolymers formed by copolymerization in organic solvent solution. Such copolymerization in solution is entirely conventional, and the polyethylenic polyethers of this invention may constitute from 5 to 75%, preferably from 20 to 60% of the copolymer, the balance being polymerizable monoethylenically unsaturated monomer. The major proportion of the monomers (over 50% thereof) is desirably nonreactive as illustrated by styrene, vinyl toluene, methyl methacrylate, ethyl acrylate, butyl or isobutyl acrylate or methacrylate, vinyl acetate, acrylonitrile, and the like. The copolymer may also include a proportion (preferably from 1–20% of the copolymer) of reactive monomer, such as hydroxy monomers (2-hydroxyethyl acrylate); N-methylol monomers (N-methylol acrylamide); or amide monomers (acrylamide), but salt-forming monomers enabling dispersion in water through salt formation are particularly preferred, e.g., acrylic acid or other monoethylenic acid enabling salt formation with a base like triethyl amine, or dimethyl amino ethyl methacrylate, enabling salt formation with an acid like acetic acid.

The invention is illustrated in the following examples.

EXAMPLE 1

Preparation of Epoxy Ether Adduct

| Reactant | Weight |
|---|---|
| Bisphenol A | 1190.98 |
| Diglycidyl ether of bisphenol A having an epoxide equivalent weight of about 184 - note 1 | 964.44 |
| Allyl glycidyl ether | 580.58 |
| Dimethyl ether of diethylene glycol | 304.00 |
| Monoethyl ether of ethylene glycol | 758.36 |
| Water | 1.37 |
| Sodium hydroxide | 0.27 |
| | 3800.00 |

Procedure
1) Charge bisphenol A, 91.2 parts of dimethyl ether of diethylene glycol, and premixed water and sodium hydroxide. Heat under nitrogen blanket and stir when bisphenol A is dissolved. Heat to 170° C.
2) Add solution of diglycidyl ether in 212.8 parts of dimethyl ether of diethylene glycol over a period of one hour, holding temperature at 170° C.
3) After addition is complete, hold one hour at 170° C.
4) Add allyl glycidyl ether slowly over one hour; hold temperature at 170° C.
5) After addition is complete, hold for 1½ hours at 170° C.
6) After holding period, cool mixture to 110° C. and add monoethyl ether of ethylene glycol to end reaction.

note 1 - Araldite 6010 of Ciba Geigy, or Epon 828 of Shell Chemical Co. may be used.

| Typical Characteristics | |
|---|---|
| Percent Nonvolatile: | 72 |
| Viscosity: | 4500 cps |
| Percent conversion: | 96 – 99 |
| Epoxide equivalence: | none |
| Percent Free allyl glycidyl ether: | 0 – 2% |

EXAMPLE 2

Example 1 was repeated to produce a diallylic product having a solids content of 68%. This product was copolymerized in organic solvent solution to produce a solvent-soluble cationic copolymer as follows:

| Monomer Composition | Total Weight |
|---|---|
| Diallylic derivative at 68% nonvolatile | 648.26 |
| 2-Ethyl hexyl methacrylate | 284.54 |
| Dimethyl amino methacrylamide | 160.06 |
| Azobis isobutyro nitrile | 18.72 |
| Tertiary dodecyl mercaptan | 28.08 |
| Methyl ethyl ketone | 91.64 |
| n-Butyl alcohol | 231.64 |
| | 1462.94 |

| Procedure: | Total Weight |
|---|---|
| 1) Charge to the reactor: | |
| (a) 75% of diallylic derivative | 486.20 |
| (b) Dimethyl amino methacrylamide | 160.06 |
| (c) 60% of n-butyl alcohol | 140.00 |
| (d) 30% of tertiary dodecyl mercaptan | 8.42 |
| 2) Charge to an additional funnel leading to the reactor: | |
| (a) 25% of diallylic derivative | 162.06 |
| (b) 2-ethyl hexyl methacrylate | 284.54 |

-continued

| | |
|---|---|
| (c) methyl ethyl ketone | 66.64 |
| (d) n-butyl alcohol | 91.64 |
| (e) tertiary dodecyl mercaptan | 19.66 |
| (f) azobis isobutyro nitrile | 14.04 |
| 3) Under a nitrogen sparge, heat the contents of the reactor to 90° C. and add the mixture in the additional funnel slowly over a period of two hours. | |
| 4) Continue heating for an additional hour, and then add the balance of the azobis isobutyro nitrile catalyst and continue to maintain 90° C. for one more hour. | |
| 5) Cool and add the rest of the methyl ethyl ketone. | |

The final product has the following properties:
Viscosity — 6550 centipoise
Nonvolatile solids — 63.95%
Conversion to polymer — 99.92%

This solution can be neutralized with an acid, such as acetic acid, formic acid or lactic acid, and dissolved in water. Using partial neutralization to adjust the pH of the water solution, the polymer is stably dispersed at a pH in the range of 6 to 7.

The invention is defined in the claims which follow.

I claim:

1. A method of producing a polyethylenically unsaturated polyether comprising reacting a polyepoxide having a plurality of epoxy groups with about one mole of a bisphenol per epoxy equivalent in said polyepoxide to consume the epoxy functionality by reaction with the phenolic OH group in said bisphenol and provide an intermediate carrying phenolic OH terminal groups, and then reacting phenolic OH terminal groups in said intermediate with the epoxy group in a molar excess of an ethylenically unsaturated monoepoxide to provide a polyethylenic polyether.

2. A method as recited in claim 1 in which said intermediate carrying phenolic OH terminal groups are reacted with a stoichiometric proportion of a monoethylenic monoepoxide.

3. A method as recited in claim 1 in which said polyepoxide has a 1,2-epoxy equivalency of from 1.2 to about 2.0.

4. A method as recited in claim 3 in which said polyepoxide is a diglycidyl ether of a bisphenol.

5. A method as recited in claim 4 in which said polyepoxide has a molecular weight of less than 1000.

6. A method as recited in claim 4 in which said polyepoxide is a diglycidyl ether of bisphenol A and has a molecular weight of less than 500.

7. A method as recited in claim 1 in which said polyepoxide is a diepoxide which is liquid or semi-solid at room temperature.

8. A method as recited in claim 1 in which said monoepoxide is allyl glycidyl ether.

9. A method as recited in claim 1 in which said reactions between the phenolic OH group and the epoxy group are carried out using heat in the presence of a base.

10. A method as recited in claim 9 in which said base is an alkali hydroxide.

11. A method as recited in claim 9 in which the polyepoxide is added slowly to the hot bisphenol containing the alkali metal catalyst.

12. The polyethylenic polyether product of the method of claim 1.

13. A solvent soluble copolymer produced by copolymerizing the product of claim 12 with at least one monoethylenically unsaturated monomer in organic solvent solution.

* * * * *